(12) United States Patent
Chi

(10) Patent No.: US 7,089,591 B1
(45) Date of Patent: Aug. 8, 2006

(54) GENERIC DETECTION AND ELIMINATION OF MARCO VIRUSES

(75) Inventor: Darren Chi, Alahambra, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/364,821

(22) Filed: Jul. 30, 1999

(51) Int. Cl.
*G06F 11/30* (2006.01)

(52) U.S. Cl. .............................. 726/24; 726/22; 726/25

(58) Field of Classification Search ........ 713/200–201, 713/207, 22–27, 30; 709/300–305, 312, 709/318; 717/162–167; 711/147; 712/14, 712/26, 216, 225–226, 220, 242; 715/500, 715/503, 523, 736, 904–907; 705/5
See application file for complete search history.

(56) References Cited

U.S. PATENT DOCUMENTS

| | | | |
|---|---|---|---|
| 5,398,196 A | 3/1995 | Chambers | .................... 364/580 |
| 5,440,723 A | 8/1995 | Arnold et al. | |
| 5,473,769 A | 12/1995 | Cozza | |
| 5,572,590 A | 11/1996 | Chess | |
| 5,696,822 A | 12/1997 | Nachenberg | |
| 5,715,174 A | 2/1998 | Cotichini et al. | |
| 5,715,464 A | 2/1998 | Crump et al. | |
| 5,812,763 A | 9/1998 | Teng | |
| 5,889,943 A | 3/1999 | Ji et al. | |
| 5,951,698 A * | 9/1999 | Chen et al. | ..................... 714/38 |
| 5,956,481 A * | 9/1999 | Walsh et al. | .................. 395/386 |
| 5,960,170 A | 9/1999 | Chen et al. | |
| 5,978,917 A * | 11/1999 | Chi | .............................. 713/201 |
| 5,987,610 A | 11/1999 | Franczek et al. | |
| 6,052,709 A | 4/2000 | Paul | |
| 6,070,244 A | 5/2000 | Orchier et al. | |
| 6,072,830 A * | 6/2000 | Proctor et al. | .......... 375/240.22 |
| 6,088,803 A | 7/2000 | Tso et al. | |
| 6,104,872 A * | 8/2000 | Kubota et al. | ............... 395/701 |

(Continued)

FOREIGN PATENT DOCUMENTS

DE  100 21 686 A1  11/2001

(Continued)

OTHER PUBLICATIONS

Kephart, Jeffrey & Sorkin, Gregory & Swimmer, Morton: An Immune System For Cyberspace, IBM Thomas J. Watson Research Center, IEEE 1997, pp. 879-884.*

(Continued)

*Primary Examiner*—Hosuk Song
*Assistant Examiner*—Leynna Ha
(74) *Attorney, Agent, or Firm*—Sonnenschein Nath & Rosenthal LLP

(57) ABSTRACT

A computer-implemented method, apparatus, and computer readable medium for detecting publicly identified and publicly unidentified macro viruses within code (15) adapted for use on a digital computer (1). A detection module (17) analyzes the code (15) to determine whether the code (15) contains instructions causing a macro (8) to be moved to a global environment (13), and whether said code (15) also contains instructions causing the same macro (8) to be copied to a local document (11). When these two conditions are satisfied, detection module (17) declares that a macro virus is present within the code (8). A repair module (19) can be coupled to the detection module (17) and to the code (15) for deleting the code (15) when the detection module (17) declares that the code (15) contains a macro virus. If the user of the detection module (17) is willing to accept a slight penalty in terms of increased detection time, detection module (17) can be made to handle string concatenation operators, proxied variable names, program calls, and/or substituted object names.

16 Claims, 5 Drawing Sheets

U.S. PATENT DOCUMENTS

| | | | |
|---|---|---|---|
| 6,108,799 A * | 8/2000 | Boulay et al. ................. 714/38 |
| 6,167,434 A | 12/2000 | Pang |
| 6,192,379 B1 * | 2/2001 | Bekenn ....................... 715/503 |
| 6,199,181 B1 | 3/2001 | Rechef et al. |
| 6,275,938 B1 | 8/2001 | Bond et al. |
| 6,338,141 B1 * | 1/2002 | Wells .......................... 713/200 |
| 6,357,008 B1 * | 3/2002 | Nachenberg ................ 713/200 |
| 6,370,648 B1 | 4/2002 | Diep |
| 6,493,007 B1 | 12/2002 | Pang |
| 6,552,814 B1 * | 4/2003 | Okimoto et al. ........... 358/1.13 |
| 6,622,150 B1 | 9/2003 | Kouznetsov et al. |
| 6,678,734 B1 | 1/2004 | Haatainen et al. |
| 6,697,950 B1 * | 2/2004 | Ko ............................. 713/201 |
| 6,748,534 B1 | 6/2004 | Gryaznov et al. |
| 6,763,462 B1 | 7/2004 | Marsh |
| 6,813,712 B1 * | 11/2004 | Luke .......................... 713/200 |
| 6,851,057 B1 | 2/2005 | Nachenberg |
| 6,910,134 B1 | 6/2005 | Maher, III et al. |
| 2002/0004908 A1 | 1/2002 | Galea |
| 2002/0035696 A1 | 3/2002 | Thacker |
| 2002/0046275 A1 | 4/2002 | Crosbie et al. |
| 2002/0083175 A1 | 6/2002 | Afek et al. |
| 2002/0091940 A1 | 7/2002 | Wellborn et al. |
| 2002/0157008 A1 | 10/2002 | Radatti |
| 2002/0162015 A1 | 10/2002 | Tang |
| 2002/0178374 A1 | 11/2002 | Swimmer et al. |
| 2003/0051026 A1 | 3/2003 | Carter et al. |
| 2003/0065926 A1 | 4/2003 | Schultz et al. |
| 2003/0115485 A1 | 6/2003 | Milliken |
| 2003/0120951 A1 | 6/2003 | Gartside et al. |
| 2003/0126449 A1 | 7/2003 | Kelly et al. |
| 2003/0191966 A1 | 10/2003 | Gleichauf |
| 2003/0212902 A1 | 11/2003 | Van der Made |
| 2003/0236995 A1 | 12/2003 | Fretwell |
| 2004/0015712 A1 | 1/2004 | Szor |
| 2004/0015726 A1 | 1/2004 | Szor |
| 2004/0030913 A1 | 2/2004 | Liang et al. |
| 2004/0158730 A1 | 8/2004 | Sarkar |
| 2005/0021740 A1 | 1/2005 | Bar et al. |
| 2005/0044406 A1 | 2/2005 | Stute |
| 2005/0132205 A1 | 6/2005 | Palliyil et al. |
| 2005/0177736 A1 | 8/2005 | De los Santos et al. |
| 2005/0204150 A1 | 9/2005 | Peikari |
| 2006/0064755 A1 | 3/2006 | Azadet et al. |

FOREIGN PATENT DOCUMENTS

| | | |
|---|---|---|
| EP | 1 280 039 A2 | 1/2003 |
| GB | 2 364 142 A | 1/2002 |
| WO | WO 97/39399 A2 | 10/1997 |
| WO | WO 01/91403 A2 | 11/2001 |
| WO | WO 02/05072 A2 | 1/2002 |

OTHER PUBLICATIONS

Parkhouse, Jayne, "Pelican Safe TNet 2.0" [online], Jun. 2000, SC Magazine Product Review, [retrieved on Dec. 1, 2003]. Retrieved from the Internet: <URL:http://www.scmagazine.com/scmagazine/standalone/pelican/sc_pelican.html.

Szor, P. and Ferrie, P., "Hunting for Metamorphic", Virus Bulletin Conference, Sep. 2001, Virus Bulletin Ltd., The Pentagon, Abington, Oxfordshire, England, pp. 123-144.

Szor, P. and Ferrie, P., Attacks on Win32, Virus Bulletin Conference, Sep. 1998, Virus Bulletin Ltd., The Pentagon, Abington, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abington, Oxfordshire, England, pp. 47-68.

Von Babo, Michael, "Zehn Mythrum Computerviren: Dichtug Und Wahrheit Uber Den Schrecken Des Informatkzeitlers," Technische Kundschau, Hallwag, Bern CH vol. 84, No. 36, Sep. 4, 1992, pp. 44-47.

Delio, M., "Virus Throttle a Hopeful Defense",. Wired News, retrieved from Internet http://www.wired.com/news/print/0, 1294, 56753, 00.html Jan. 1, 2003.

"System File Protection and Windows ME", [online], last updated Dec. 4, 2001, [retrieved on Apr. 9,. 2002] Retrieved from the Internet: <URL: http://222.Microsoft.com/hwdev/archives/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL:http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abington, Oxfordshire, England, pp. 1-22.

Von Babo, Michael, "Zehn Mythen um Computerviren: Dichtung und Wahrheit Ober den Schrecken des Informatikzeitalters," 1155 Technische Rundschau, Bern, Switzerland, vol. 84, No. 36. Sep. 4, 1992, pp. 44-47.

Toth et al., "Connection-history based anomaly detection", Proceedings of the 2002 IEEE Workshop on Information Assurance and Security, West Point, NY, Jun. 17-19, 2002. pp. 30-35.

* cited by examiner

GENERIC DETECTION AND ELIMINATION OF MARCO VIRUSES

TECHNICAL FIELD

This invention pertains to the field of detecting and eliminating computer viruses of a particular class known as macro viruses.

BACKGROUND ART

U.S. Pat. No. 5,398,196 discusses the detection of viruses within a personal computer. However, unlike the present invention, this reference does not treat the elimination of detected viruses, nor does it discuss macro viruses.

A first existing technology used by anti-virus programs to detect and repair macro viruses requires, for each unique new macro virus, the development of a detection and repair definition (virus signature). Thus, this first technology is capable of detecting only publicly identified macro viruses (see below definition). After the development of the detection and repair definition, the user's anti-virus software must be augmented with the new definition before it can detect the newly discovered macro virus. This method has the advantage that a skilled anti-virus researcher is able to study the virus and understand it enough so that a proper detection and repair definition can be created for it. The main disadvantage is that a relatively long turnaround time is required before the general public is updated with each new definition. The turnaround time includes the duration during which the virus has a chance to spread and possibly wreak havoc, the time to properly gather a sample and send it to an anti-virus research center, the time required to develop the definition, and the time to distribute the definition to the general public. This process is similar to the process used for protecting against the once more prevalent DOS-based viruses.

A second technology uses rudimentary heuristics that can scan for newly developed macro viruses. These heuristics employ expert knowledge of the types of viruses they seek. Often these heuristics look for strings of bytes that are indicative of viral behavior—for example, strings found in currently known viruses. Current heuristics are very good at detecting, with high level of confidence, new viruses that are variants of known viruses, but not so good at detecting new viruses that are not variants of known viruses. Another disadvantage of most current heuristics is that they are good for viral detection only, and are not capable of eliminating macro viruses once found. This is true of both macro virus heuristics and DOS virus heuristics. The present invention is an example of the second technology (heuristics). It is capable of identifying both publicly identified macro viruses and publicly unidentified macro viruses (see the below definitions). Furthermore, it offers the significant advantage that it is capable of eliminating macro viruses that are detected.

DISCLOSURE OF INVENTION

A computer implemented method, apparatus, and computer readable medium for detecting macro viruses in code (15) adapted for use on a digital computer (1). A detection module (17) analyzes the code (15) to determine whether the code (15) contains instructions causing a macro (8) to be moved to a global environment (13), and whether the code (15) also contains instructions causing the same macro (8) to be copied to a local document (11). When these two conditions are satisfied, detection module (17) declares that a macro virus is present within the code (15).

BRIEF DESCRIPTION OF THE DRAWINGS

These and other more detailed and specific objects and features of the present invention are more fully disclosed in the following specification, reference being had to the accompanying drawings, in which.

DEFINITIONS

As used throughout the present specification and claims, the following words and expressions have the indicated meanings:

"macro" is a computer program written using a structured programming language and created from within an application program that has a global environment and can create local documents. Normally, a macro can be invoked using a simple command such as a keystroke. The application program can be, for example, Microsoft Word or Microsoft Excel.

"global environment" is an area within a storage medium that is associated with a particular application program and stores parameters and/or macros that are used every time said application program is used. For example, the global environment for a particular application program can contain text, graphics, and one or more macros.

"local document" is a document that has been generated by an application program.

"virus" is a malicious computer program that replicates itself.

"macro virus" is a virus consisting of one or more macros.

"payload" is an unwanted destructive task performed by a virus. For example, the payload can be reformatting a hard disk, placing unwanted messages into each document created by an application program, etc.

"heuristics" is a set of inexact procedures.

"publicly identified macro virus" is a macro virus that has a known viral signature.

"publicly unidentified macro virus" is a macro virus that cannot be identified by antivirus software using viral signature matching techniques.

DETAILED DESCRIPTION OF THE PREFERRED EMBODIMENTS

The purpose of the present invention is to detect and eliminate macro viruses in a generic manner, i.e., the present invention works regardless of whether the virus is a publicly identified or a publicly unidentified macro virus.

The present invention uses heuristics that can determine effectively whether any given code 15 contains a macro virus or not, and determine exactly the set of macros that comprise the virus. This is achieved by means of detection module 17 analyzing code 15 for the presence of two types of instructions, as described below.

The present invention offers the following advantages over the prior art:

- a generic detection and repair solution for new (publicly unidentified) macro viruses.
- virtually no turnaround time.
- ability to determine with an extremely high degree of confidence that a set of macros declared to be a virus is indeed a virus.
- ability to determine the set of macros that comprise the virus, thus providing an immediate repair solution.
- reduced workload for all personnel involved, in terms of virus discovery, analysis, and definition creation.
- increased user satisfaction with regard to protection against new (publicly unidentified) viruses.

Figure 1:
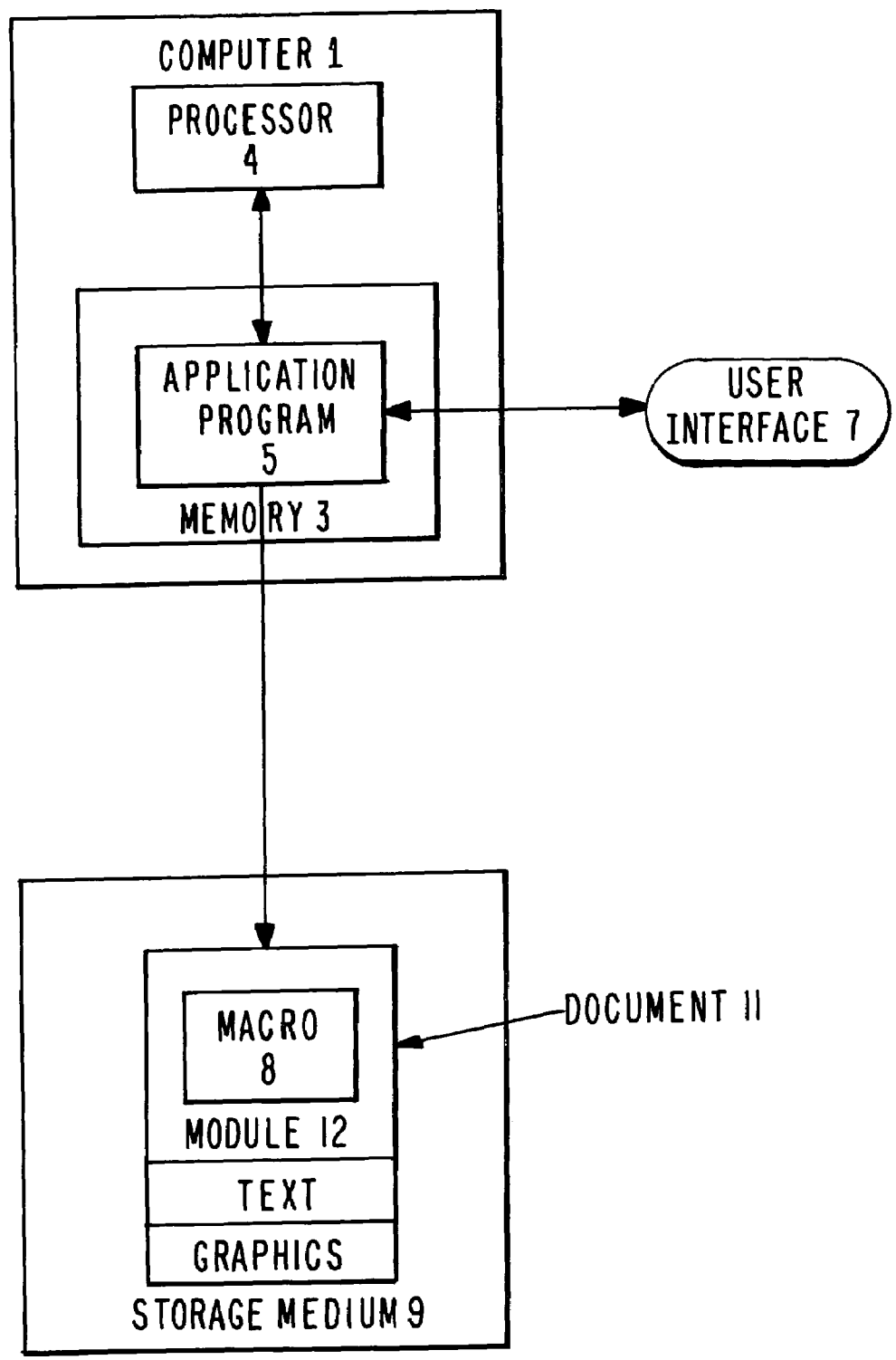
FIG. 1 is a block diagram showing the type of application program 5 in the existing body of art that can be contaminated by macro viruses detectable by the present invention.

FIG. 1 illustrates a typical operating environment of the present invention. A digital computer 1 comprises a processor 4 and memory 3. When it is to be executed, application program 5 is moved into memory 3 and is operated upon by processor 4. Application program 5 is any program that generates macros, for example, Microsoft Word or Microsoft Excel. When it is executed, application program 5 generates one or more local documents 11, which are stored in storage medium or media 9 associated with computer 1. For example, storage medium 9 can be a hard disk, floppy disk, tape, optical disk, or any other storage medium used in connection with digital computers. Each document 11 can comprise text, graphics, and/or one or more macros 8. Each macro 8 is typically contained within a module 12. A module can contain one or more macros 8. A user of computer 1 typically communicates with application program 5 via user interface 7, which may comprise a keyboard, monitor, and/or mouse.

Figure 2:
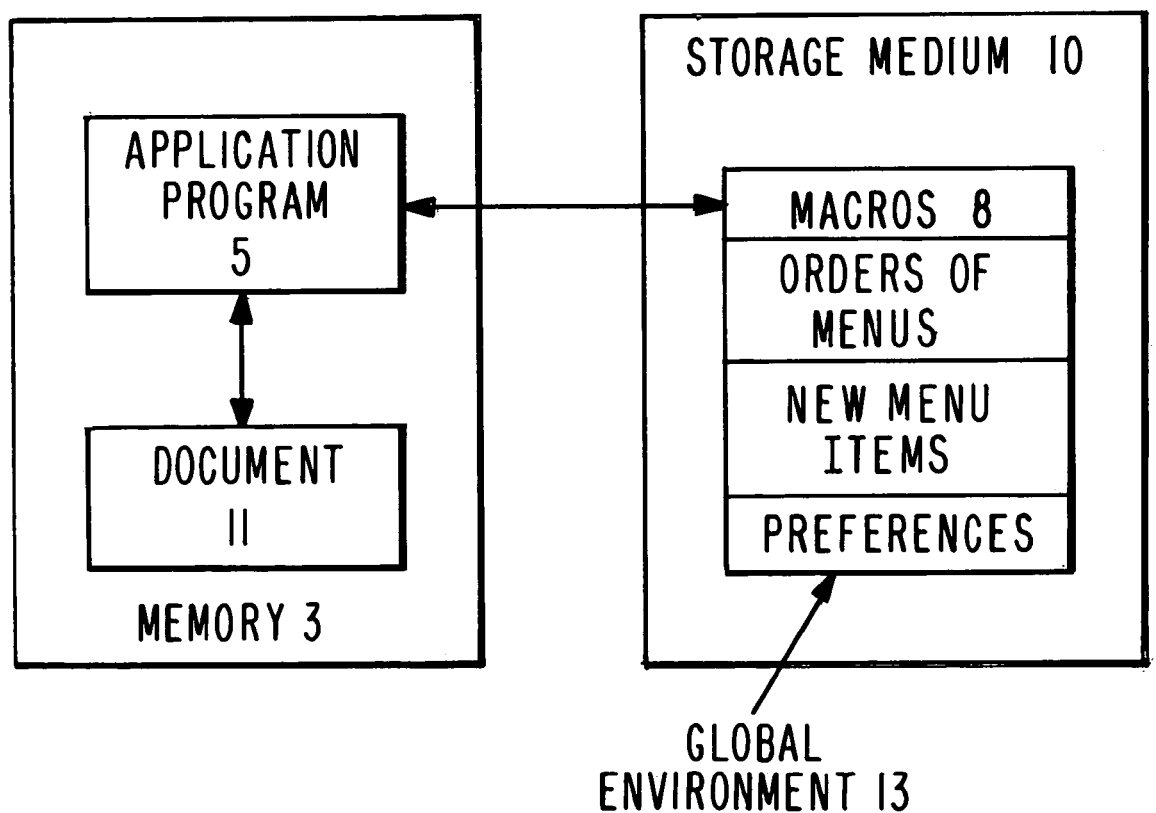
FIG. 2 is a block diagram showing global environment 13 associated with application program 5 of FIG. 1.

FIG. 2 shows a document 11 that has been opened by application program 5. Because document 11 has been so opened, it resides in memory 3, where it can be readily and quickly accessed by application program 5. As stated previously, document 11 can contain one or more macros 8. If one of these macros 8 is named AutoOpen or a similar name, said macro 8 will execute automatically. Alternatively, the macro 8 could execute upon the user pressing a certain key on keyboard 7, or upon the occurrence of another event.

FIG. 2 also illustrates the presence of the global environment 13 that is associated with application program 5. Global environment 13 is available to the user every time he or she uses application program 5, and is specific to each such application program 5. Global environment 13 typically contains a set of macros 8 previously established by the user, orders of menus, new menu items, and preferences of the user, e.g., font styles and sizes.

There is typically just one global environment 13 per computer 1 per application program 5, even if different users share the same program 5. Global environment 13 is located within storage medium 10. Storage medium 10 can be the same storage medium 9 as used by one or more documents 11 that have been generated by application program 5. Alternatively, storage medium 10 may be distinct from storage medium 9 or storage media 9. Storage medium 10 can be any storage device used in conjunction with a digital computer, such as a hard disk, floppy disk, tape, optical disk, etc.

If application program 5 is the spreadsheet software known as Microsoft Excel, then global environment 13 has a typical location which is the subdirectory named "XLSTART" in the directory where Excel is stored (i.e., "C:/EXCEL/XLSTART"); a document 11 is called a "workbook"; macros 8 reside within modules 12 in the workbook; and the language in which the macros 8 are written is Visual Basic, an object oriented language.

Figure 3:
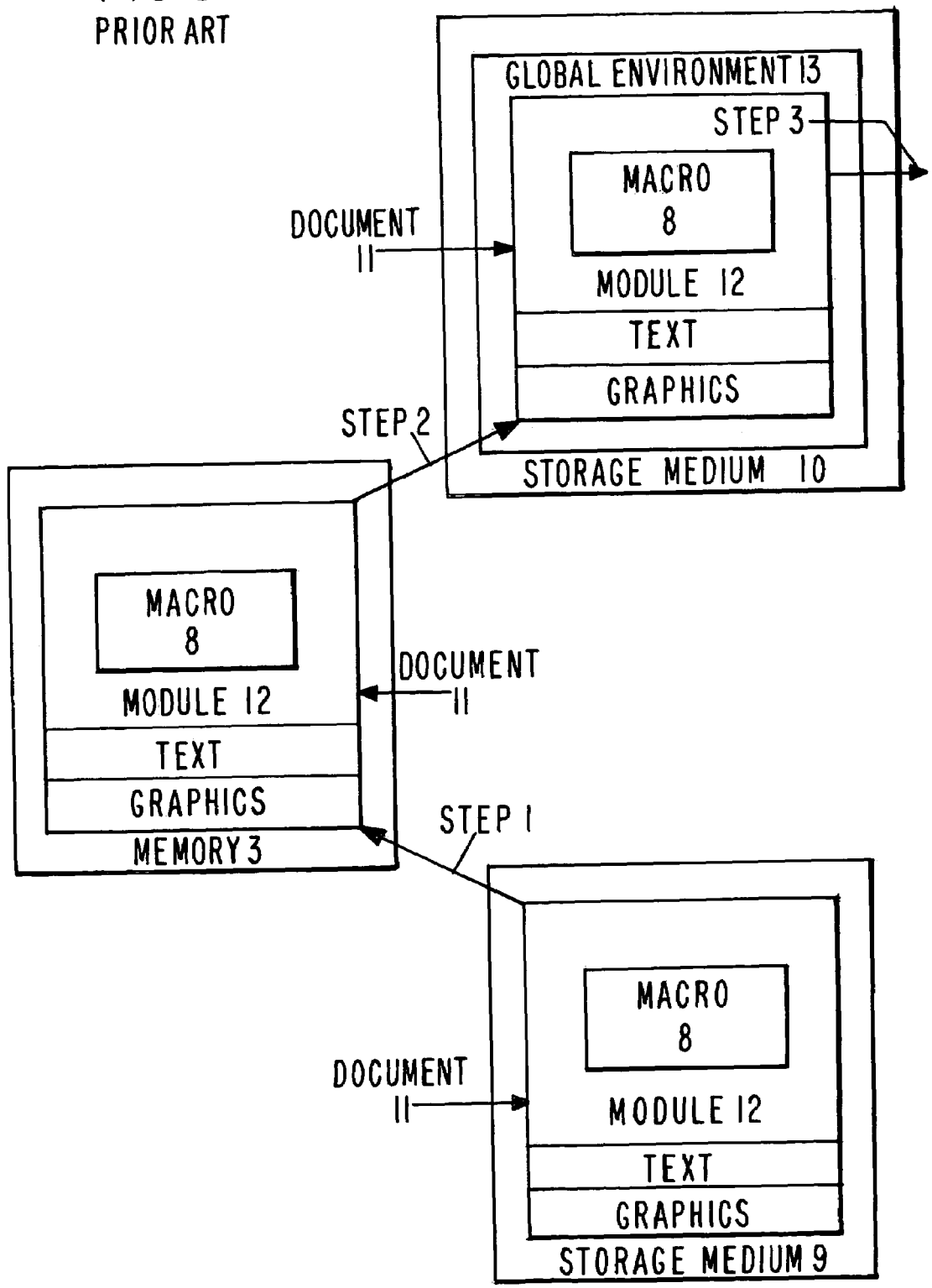
FIG. 3 is a block diagram showing how a macro virus can contaminate the computing environment illustrated in FIGS. 1 and 2.

FIG. 3 illustrates how macro viruses propagate (replicate) into the global environment 13. In step 1, document 11 is opened by application program 5. During step 1, document 11, including all the elements contained therewithin, move from storage medium 9 to memory 3. In the illustrated embodiment, document 11 comprises a module 12 containing a macro 8, text, and graphics. The text may be, for example, a letter that the user has created previously. All of these items move to memory 3.

Let us assume that macro 8 contains a virus. In step 2, in the case where program 5 is Microsoft Excel, macro virus 8 causes the entire document 11 to be moved to global environment 13.

In step 3, macro virus 8 manifests its payload, usually by copying itself into another local document 11. Step 3 can be precipitated every time a new document 11 is generated by application program 5 or less often; for example, every time that document 11 is a letter addressed to a certain individual. In any event, the payload of macro 8 has a highly negative effect on computer 1. For example, this payload can entail infecting certain documents 11 with gibberish, reformatting a storage medium 9, 10, etc.

Thus does macro virus 8 infect the global environment 13, and from there is poised like a coiled snake ready to infect other documents 11. This is because the global environment 13 is always active, and thus, macro virus 8 is always active. From the newly infected documents 11, this virus 8 can infect the global environments 13 of all users to whom the infected documents 11 are passed.

Figure 4:
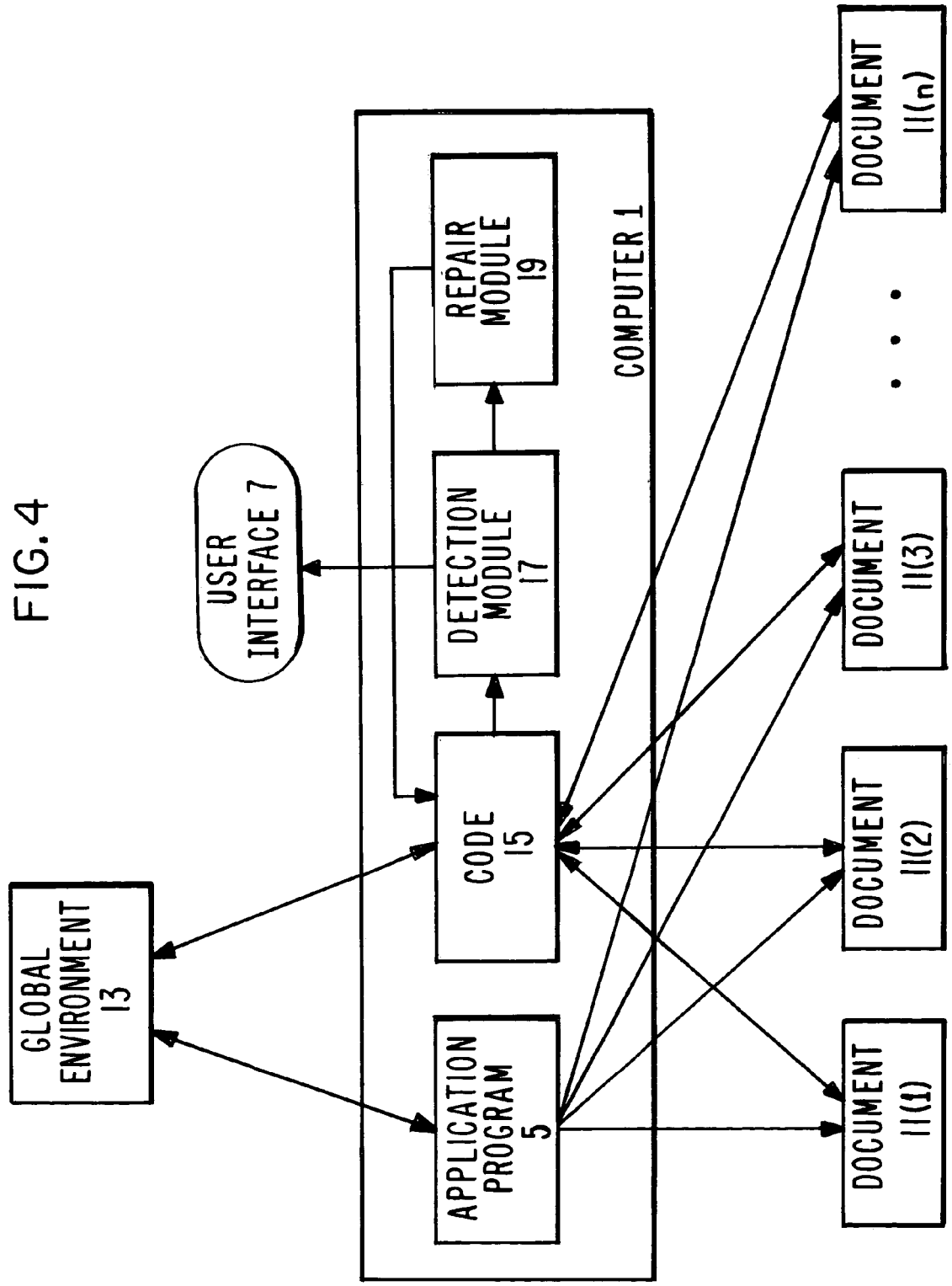
FIG. 4 is a block diagram showing a preferred embodiment of the present invention.

FIG. 4 illustrates apparatus by which the present invention detects and eliminates macro viruses. Code 15 is what is analyzed by the present invention for the presence of macro viruses. Code 15 is adapted to be used from within computer 1, where it will be coupled to the documents 11 generated by application program 5 and to global environment 13. Coupled to code 15 is detection module 17, which is the module of the present invention that determines whether a macro virus is present within code 15, based upon the simultaneous presence of two conditions, as described below. Module 17 can be implemented in hardware, firmware, and/or software.

FIG. 4 illustrates the special case where detection module 17 and code 15 are simultaneously resident within computer 1. However, code 15 does not have to be resident within computer 1 in order for the present invention to work; code 15 can be resident on a hard disk, floppy disk, or other storage medium not currently a part of computer 1.

Detection module 17 is coupled to user interface 7, so that module 17 may announce its decisions concerning detection of macro viruses to the user. Coupled to detection module 17 is repair module 19, which eliminates macro viruses that have been determined by detection module 17 to be present. Repair module 19 is also coupled to code 15. Module 19 can be implemented in hardware, firmware, and/or software.

Figure 5:
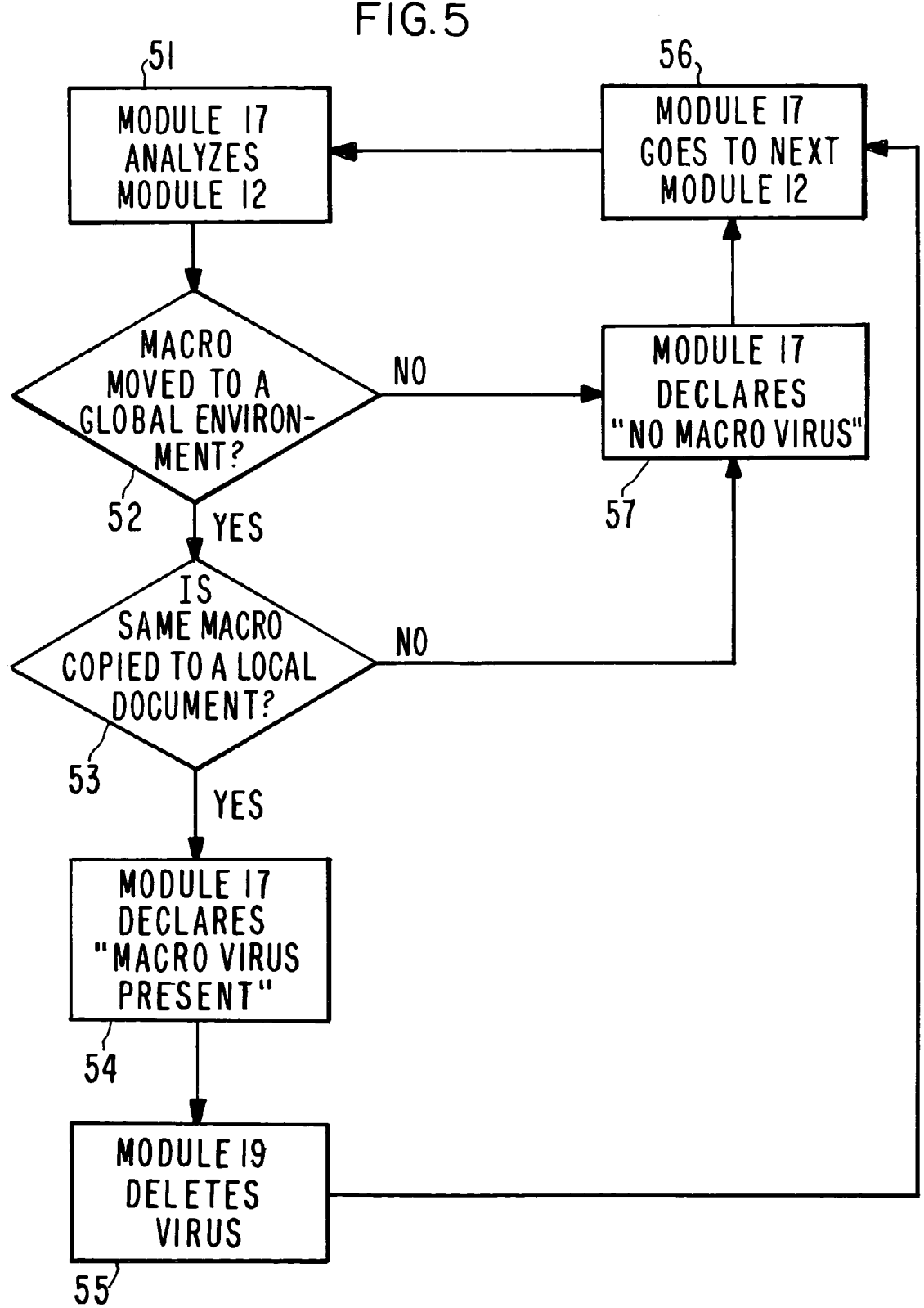
FIG. 5 is a flow diagram showing a preferred embodiment of the present invention.

The method of the present invention is illustrated in FIG. 5. In step 51, detection module 17 begins to analyze code 15. It does this by examining a first module 12 within code 15. Module 17 first determines whether the module 12 contains a macro 8. The determination as to whether something is a macro is a conventional technique in computer programming. Another (optional) preprocessing step is for module 17 to determine the language in which code 15 has been written. This determination is again a conventional technique of computer programming. In the special case where code 15 is meant to be used in association with the Microsoft Excel spreadsheet application program 5, this step is not necessary, because it is known that the macros 8 in Excel have to be written in the Visual Basic language.

In step 52, module 17 determines whether the code 15 under test contains instructions that cause a macro 8 to be moved to a global environment 13. This is the first of two conditions that module 17 uses to determine the presence of a macro virus. In the case where the code 15 is written in Visual Basic, module 17 preferably deems that this first condition is satisfied when a SaveAs command that performs this operation is present within code 15. If module 17 determines that the first condition is not satisfied, module 17 declares at step 57 that no macro virus is present within the analyzed macro 8. This declaration may be passed to the user via user interface 7. At this point, there is no need for module 17 to continue analyzing that macro 8, so at step 56 module 17 goes to the next macro 8, and analyzes this new macro 8 as before.

If, on the other hand, the result of step 52 is that module 17 has determined that the first condition for the presence of a macro virus has been satisfied, module 17 flags the macro 8 under test, and proceeds to the next step, step 53, where module 17 determines whether the second condition for the presence of a macro virus is satisfied. This condition is the presence within module 12 of instructions that copy the same macro 8 that was flagged within step 52 to a local document 11. In the case where the code 15 is written in the Visual Basic language, the determination as to whether a macro 8 is being copied to a local document 11 is preferably made by detecting the presence of a Copy command that performs this operation. If this second condition is not satisfied, module 17 again declares at step 57 that no macro virus is present.

If, on the other hand, module 17 has determined within step 53 that the second condition for the presence of a macro virus has been satisfied, both conditions have now been satisfied, and module 17 declares at step 54 that a macro virus is indeed present within module 12. This declaration can be passed to the user via user interface 7. As this point, in the preferred embodiment, repair module 19 eliminates the virus at step 55. This is typically done by "deleting" the virus, as that term is used in conventional computer programming. In the preferred embodiment, repair module 19 deletes the entire module 12 containing the virus. Alternatively, module 19 deletes just the macro 8 that was flagged in step 52 as the subject of a move to a global environment 13 and in step 53 to be the subject of a copy to a local document 11.

Lets us now give an example to illustrate the operation of the preferred embodiment. In this example, application 5 is Microsoft Excel and module 12 comprises three lines of Visual Basic code as follows:
 start=Application.StartupPath
 newname=ActiveWorkbook.Name
 Workbooks (newname).SaveAs filename:=start & "/" & "main.xls"

The first two lines of code constitute the initialization of variables named "start" and "newname", respectively. The third line of code is a command line. "Workbooks" is the set of all workbooks that are currently open. Initially it is a null set, because no documents 11 are open the first time Excel is opened. The presence of the SaveAs command means that something called Workbooks (newname) is being saved someplace. "filename" is a parameter to the SaveAs command. We know that is a parameter because of the ":=" following it. The item being saved is saved to the location "start/main.xls". Note the presence of the two concatenation operators "&". The presence of these concatenation operators may well indicate that the author of the virus attempted to disguise the presence of the virus by breaking up the destination location of the SaveAs into three parts. "Application.StartupPath" evaluates to Excel's startup directory, which is its global environment 13. Assuming that this location is "C:/EXCEL/XLSTART", when we substitute the value of "Application.StartupPath" for the variable "start", we see that the item to be saved is saved in the location "C:/EXCEL/XLSTART/main.xls". main.xls is an arbitrary name given by the author of the virus. We know that Application.StartupPath is the location of the startup directory within a global environment 13. Global environment 13 also contains an alternative startup directory that can be referred to from within a Visual Basic macro using Application.AltStartupPath.

Making the substitution of variables, the item being saved to the global environment 13 is a local document 11 called "ActiveWorkbook.Name". In the context of this module 12, this active workbook 11 is the one containing the module 12, and thus this module 12 (which is known to contain a macro 8) is saved to the global environment 13.

Thus, module 12 contains instructions causing a macro 8 to be moved to a global environment 13. Therefore, the first condition (step 52) for the presence of a macro virus is satisfied.

In our example, let us assume that module 12 also contains the following code:
 papy_name=ActiveWorkbook.Name
 Workbooks ("MAIN.XLS").Sheets ("junior").Copy before:=Workbooks (papy_name).Sheets (1)

In the Visual Basic syntax, something to the left of an "=" is a variable.

"Name" is a user-given name.

"junior" is the name of the module 12 that contains the virus. We know that the module 12 containing the three lines of code that satisfied condition one is in "junior" (part of main.xls), because we assume that module 17 has noted that "junior" is the name of the module 12 containing this code. Alternatively, we can use other means to determine where the suspicious code 15 is going to be sent, e.g., we can determine whether there is some other code renaming "junior" as "senior".

In this example, "before" means "the location just before". Here the syntax requires an "after" or a "before". In the second line of this code, the module named "junior" from the globally installed workbook 11 named "main.xls" is copied to the active workbook 11, which, at the time of execution of the above two lines, is the workbook 11 currently being edited by the user.

Thus, the same module 12 that was flagged in step 52 as being saved into the global environment 13 is now uncovered to be copied into a local document (workbook 11). Therefore, module 17 determines that condition two is satisfied, and therefore declares that this module 12 contains a macro virus.

In order for the implementation of this invention to be robust, and thus able to detect the greatest number of viruses, it is desirable, although not necessary, for detection module 17 to have one or more of the following four enhancement features. Each of these features slows down the operation of module 17. However, one can implement each of these features with extreme robustness or minimum robustness, depending upon the degree of robustness expected to be desirable. The factors that go into this determination include memory 3 constraints, execution time constraints, and expected real world scenarios.

The four enhancement features are:

1. The ability to understand and handle string concatenation operations in the analyzed modules 12. For example, any string in Visual Basic can be concatenated. The reason for this first enhancement feature is that, for example, the virus designer could have referred to "junior" as "jun" & "ior". In this case, it is desirable for module 17 to recognize this as "junior". Module 17 will so recognize this as "junior" if enhancement feature 1 is present.

2. The second enhancement feature is the ability for module 17 to understand and handle variable assignment operations in order to trace the values of variables. This is sometimes referred to as variables being "proxied". For example, the virus designer could have written the code to be:

papy_name=ActiveWorkbook.name
a="jun"
b="ior"
c=a&b
Workbooks ("MAIN.XLS").Sheets (c).Copy before: =Workbooks (papy_name).Sheets (1)

If we want to detect "junior" in this case, we need to make all of these variable substitutions. Since there is a constraint on the size of memory 3, and on the amount of time that can be used, we might limit module 17 to where it will perform only an arbitrary number (for example 16) of substitutions. This is because it is expected that the amount of variable usage is small in most cases, and we accept this tradeoff between robustness and speed/memory constraints.

3. The third enhancement feature is for module 17 to have the ability to trace the value of parameter values through function calls (subroutine calls). For example, suppose that code 15 contains:

sub CopyIt (SheetName)
    papy_name=ActiveWorkbook.Name
    Workbooks ("MAIN.XLS").Sheets (SheetName).Copy
        before:=workbooks (papy_name) Sheets (1)
End Sub
Sub InfectDocument
    sName="junior"
    CopyIt (sName)
End Sub In this example, the value of the parameter variable SheetName is being passed to the subroutine CopyIt from another subroutine (function) called InfectDocument, in an attempt by the virus designer to obfuscate what is happening.

4. The fourth enhancement feature is giving module 17 the ability to understand and handle the object model of Visual Basic, e.g., object/subobject hierarchy parsing and understanding. For example, a straightforward way of initializing the variable "start" would be to write:

start=Application.StartupPath

However, if the virus designer wanted to obfuscate what he or she was doing, said designer might write:

app=Application
start=app.StartupPath

In this case, "Application" is an object. If the fourth enhancement feature is present, module 17 has the ability to handle substituted object names.

The above description is included to illustrate the operation of the preferred embodiments and it is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus.

2. The method of claim 1 wherein the macro is contained within a module.

3. The method of claim 1 wherein the code is associated with a Microsoft Excel spreadsheet application.

4. The method of claim 1 wherein the code is written in the Visual Basic language.

5. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus; wherein:

the code is written in the Visual Basic language; and the step of analyzing the code to determine whether said code contains instructions causing a macro to be moved to a global environment comprises determining whether a SaveAs command is present in the code.

6. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus; wherein:

the code is written in the Visual Basic language; and the step of analyzing the code to determine whether said code contains instructions causing the flagged macro to be copied to a local document comprises determining whether a Copy command is present in the code.

7. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus;

wherein each analyzing step concatenates strings when said analyzing step encounters a concatenation operator within the code.

8. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus;

wherein each analyzing step makes substitutions for variable names when the code contains variable names that are proxied.

9. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus;

wherein each analyzing step traces the values of parameter variables when the code contains instructions that are invoked by other code.

10. A computer-implemented method for detecting a macro virus in code adapted for use on a digital computer, said method comprising the steps of:

analyzing the code to determine whether said code contains instructions causing a macro to be moved to a global environment;

when the code contains instructions causing a macro to be moved to a global environment, flagging said macro;

analyzing the code to determine whether said code contains instructions causing the flagged macro to be copied to a local document; and when the code contains instructions causing the flagged macro to be copied to a local document, declaring that said flagged macro contains a macro virus;

wherein each analyzing step substitutes object names when the code is written in an object oriented programming language and when the code contains substituted object names.

11. The method of claim 1 further comprising the step of deleting the macro virus.

12. The method of claim 1 wherein publicly identified and publicly unidentified macro viruses are detected.

13. A computer-implemented method for detecting publicly identified and publicly unidentified macro viruses in code adapted for use on a digital computer, said method comprising the steps of:

analyzing the code to determine whether said code contains instructions causing a macro to be moved to a global environment;

when the code does not contain instructions causing a macro to be moved to a global environment, declaring that no macro virus is present;

when the code contains instructions causing a macro to be moved to a global environment, flagging said macro;

analyzing the code to determine whether said code contains instructions causing the flagged macro to be copied to a local document;

when the code does not contain instructions causing the flagged macro to be copied to a local document, declaring that no macro virus is present; and when the code contains instructions causing the flagged macro to be copied to a local document, declaring that said flagged macro contains a macro virus.

14. Apparatus for detecting publicly identified and publicly unidentified macro viruses, said apparatus comprising:

a digital computer having at least one storage device;

associated with said digital computer, code containing computer instructions;

an application program associated with said computer;

a global environment associated with said application program;

at least one local document generated by said application program and located within said storage device; and a detection module coupled to said code, said detection module analyzing said code and making the determination that a macro virus is present when said code contains instructions causing a macro to be moved to a global environment and said code also contains instructions causing the same macro to be copied to a local document.

15. The apparatus of claim 14 further comprising a repair module coupled to the detection module and to the code, said repair module adapted to delete the code when the detection module determines that the code contains a macro virus.

16. A computer readable medium containing a computer program for detecting a macro virus in code adapted for use on a digital computer, said program containing instructions for performing the steps of:

analyzing the code to determine whether said code contains instructions causing a macro to be moved to a global environment;

when the code contains instructions causing a macro to be moved to a global environment, flagging said macro;

analyzing the code to determine whether the code contains instructions causing the flagged macro to be copied to a local document; and when the code contains instructions causing the flagged macro to be copied to a local document, declaring that said flagged macro contains a macro virus.

* * * * *

UNITED STATES PATENT AND TRADEMARK OFFICE
CERTIFICATE OF CORRECTION

| | | |
|---|---|---|
| PATENT NO. | : 7,089,591 B1 | Page 1 of 1 |
| APPLICATION NO. | : 09/364821 | |
| DATED | : August 8, 2006 | |
| INVENTOR(S) | : Darren Chi | |

It is certified that error appears in the above-identified patent and that said Letters Patent is hereby corrected as shown below:

On page 1, at number 54, line 2, please change "MARCO" to --MACRO--; and

At column 1, line 2, please change "MARCO" to --MACRO--.

Signed and Sealed this

Twenty-first Day of November, 2006

JON W. DUDAS
*Director of the United States Patent and Trademark Office*